(12) United States Patent
Pletscher

(10) Patent No.: US 9,074,952 B2
(45) Date of Patent: Jul. 7, 2015

(54) PRESSURE SENSOR FOR LOW-VISCOSITY MEDIA

(75) Inventor: Ernst Pletscher, Marthalen (CH)

(73) Assignee: KISTLER HOLDING AG, Winterthur (CH)

(*) Notice: Subject to any disclaimer, the term of this patent is extended or adjusted under 35 U.S.C. 154(b) by 343 days.

(21) Appl. No.: 13/511,483

(22) PCT Filed: Nov. 18, 2010

(86) PCT No.: PCT/CH2010/000290
§ 371 (c)(1),
(2), (4) Date: May 23, 2012

(87) PCT Pub. No.: WO2011/063537
PCT Pub. Date: Jun. 3, 2011

(65) Prior Publication Data
US 2012/0266683 A1    Oct. 25, 2012

(30) Foreign Application Priority Data

Nov. 25, 2009  (CH) ...................................... 1810/09

(51) Int. Cl.
*G01L 9/00* (2006.01)
*G01L 7/00* (2006.01)
*G01L 23/10* (2006.01)
(52) U.S. Cl.
CPC ................. *G01L 9/008* (2013.01); *G01L 23/10* (2013.01)
(58) Field of Classification Search
None
See application file for complete search history.

(56) References Cited

U.S. PATENT DOCUMENTS

| 3,349,259 A | 10/1967 | Kistler |
| 3,801,838 A | 4/1974 | Kistler |
| 2007/0277618 A1 | 12/2007 | Kroeger et al. |
| 2008/0011089 A1* | 1/2008 | Friedl ............................ 73/753 |

FOREIGN PATENT DOCUMENTS

| DE | 103 45 299 | 7/2005 |
| WO | 2007/043068 | 4/2007 |

OTHER PUBLICATIONS

International Search Report on Patentability, issued Feb. 21, 2011.
English Translation of International Preliminary Report on Patentability, issued Jun. 7, 2012.

* cited by examiner

*Primary Examiner* — Lisa Caputo
*Assistant Examiner* — Brandi N Hopkins
(74) *Attorney, Agent, or Firm* — Dority & Manning, P.A.

(57) ABSTRACT

A sensor for measuring pressures in low-viscosity media for use in injection molding includes a housing with an axis A, a flat end face to be exposed to a pressure space, and a diaphragm that is arranged on the end face and is permanently connected to the housing. A measuring element that can infer a pressure prevailing in the pressure space on the basis of deflection of the diaphragm is arranged behind the diaphragm. A pressure sleeve that is tightly connected to the sensor on the end face and is arranged at a distance from the housing with a gap behind this connection is arranged coaxially with the housing axis A outside the housing. The gap extends axially further across the measuring element than the region of the force path in the direction away from the pressure space.

10 Claims, 3 Drawing Sheets

PRESSURE SENSOR FOR LOW-VISCOSITY MEDIA

CROSS-REFERENCE TO RELATED APPLICATIONS

This application claims priority to International Application Ser. No. PCT/CH2010/000290 filed Nov. 18, 2010, which claims priority to Swiss Application No. CH 1810/09 filed Nov. 25, 2009.

FIELD OF THE INVENTION

The invention relates to a sensor for measuring pressures in low-viscosity media for use in injection moulding, comprising a housing with an axis A, an end face to be exposed to a pressure space, and a diaphragm which is arranged on the end face and is permanently connected to the housing, wherein a measuring element which can infer a pressure prevailing in the pressure space on the basis of deflection of the diaphragm is arranged behind the diaphragm.

BACKGROUND

Such sensors as described above are used in particular in injection moulding and are therefore exposed to high pressure and temperature differences. An example of a sensor according to the prior art is the sensor type 6167 from Kistler Instruments AG in Switzerland, also described in U.S. Pat. No. 6,212,963, which is hereby incorporated herein for all purposes by this reference. Typically such sensors have a relatively thick diaphragm, because in use they are exposed to severe mechanical stress, for example when removing the injection moulded part.

For technical reasons, pressure sensors for other application areas can often not be used as pressure sensors in cavities in injection moulding, since they have, for example, too slow a response time or too low a resolution, are not sufficiently temperature-resistant, or in particular also, they cannot withstand the constant high temperature changes.

Such pressure sensors are always mounted in the tool with a small spacing gap. In injection moulding with low-viscosity materials, this moulding material ultimately flows into the gap between sensor and tool and thereby causes a lateral pressure on the frontal region of the sensor. This pressure, acting radially on the sensor housing, ultimately causes a deflection of the diaphragm, which generates an error signal. Studies using comparative measurements, in which a reference measurement was carried out with a thin film glued to the front face, have produced a deviation of up to 20%.

Further problems with such sensors are caused by stresses of the fronts of the sensors when the mounting conditions are correspondingly unfavourable. It has been shown that pressure sensors in the injection moulding field, due to their high-resolution property, tend to generate an error signal on the measuring element even under very small stresses of the housing.

BRIEF SUMMARY OF THE INVENTION

The object of the present invention is to specify a sensor of the above indicated type, which severely reduces incorrect measuring caused by a radially acting lateral pressure.

The object is achieved as described by the text that follows. In particular, the sensor according to the invention comprises a pressure sleeve arranged coaxially with the housing axis A outside the housing, which is tightly connected to the sensor on the end face. Behind this connection the pressure sleeve is arranged at a distance from the housing with a gap, wherein this gap extends axially further across the measuring element than the region of the force path in the direction away from the pressure space.

The pressure sleeve should in particular be constructed with sufficient strength so that it can withstand the lateral pressure occurring, without transmitting this lateral pressure inwards.

BRIEF DESCRIPTION OF THE DRAWINGS

Below, the invention is described in more detail by reference to the drawings. The same reference labels have been maintained in all drawings. They show.

DESCRIPTION OF EXEMPLARY EMBODIMENTS OF THE INVENTION

Figure 1:
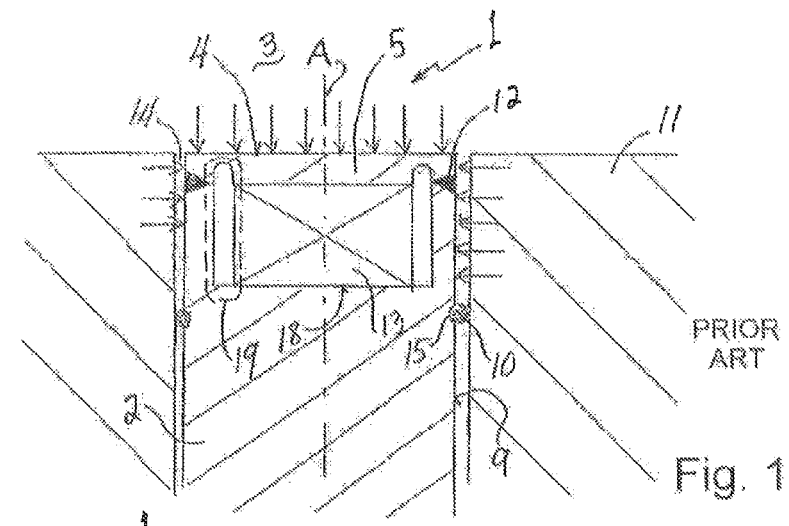
FIG. 1 a schematic illustration of a sensor in the frontal region according to the prior art.

FIG. 1 shows a sensor 1 according to the prior art in a simplified view, mounted in a tool 11. The sensor 1 comprises a housing 2 having a jacket surface 9 and having an axis A extending centrally through the housing 2. It comprises an end face 4, which when installed is exposed to a pressure space 3. On the end face of the housing 2 a diaphragm 5 is arranged, which is permanently connected to the housing 2. The diaphragm 5 is typically welded to the housing 2 at a weld seam 12. On the basis of a deflection of the diaphragm 5 the sensor 1 can infer a pressure prevailing in the pressure space 3. For this purpose, the sensor 1 has a measuring element 13, for example a piezoelectric crystal, which is arranged behind the diaphragm 5 and is supported on the housing 2 at the rear by a projection 18 of the housing. The closed force path in the sensor caused by a pressure in the pressure space 3 extends across the diaphragm 5, through the measuring element 13, across the projection 18 of the housing over to the housing 2 and finally across the weld seam 12 back again to the diaphragm 5. Also, in alternative configurations which have an optical sensor or a strain gauge as a measuring element 13, for example in an oil-filled sensor, the force path extends on both sides of the diaphragm 5 axially to the rear and near the projection of the housing 18 finally comes together again.

The end face 4 of the sensor 1 is flat, so that during injection moulding no imprint is left behind.

The arrows in the Figures indicate the pressure which acts on the frontal region of the sensor 1. Apart from the pressure to be determined, which acts in an axial direction on the diaphragm 5, an unwanted pressure acts radially on the jacket surface 9 in the frontal region of the sensor 1, because a gap 14 is always present between sensor 1 and tool 11. When using low-viscosity materials in injection moulding, these flow into the gap 14 and cause this unwanted radial pressure. This radial pressure causes a deformation of the housing 2 in this frontal region, because the housing typically has thin walls there, in order to leave room next to the measuring element 13. A deformation of the housing 2 leads directly to a deformation of the adjoining diaphragm 5, which leads to a false measurement. It would be conceivable to configure the housing 2 with greater stiffness at this point. A disadvantage of this arrangement however is the impaired attachment of the diaphragm to the housing.

An O-ring 10 can be attached to the jacket surface 9 of the sensor 1, in order to seal the gap 14 between sensor 1 and tool 11. The O-ring 10 requires a notch 15 on the jacket surface 9 of the housing 2 as a stop for positioning it. The O-ring 10 must be arranged behind the measuring element 13, because the notch 15 would further weaken the sensor housing 2 in the region of the measuring element 13, where it is already very thin. This would in turn have a negative effect on the measurement.

Figure 2:
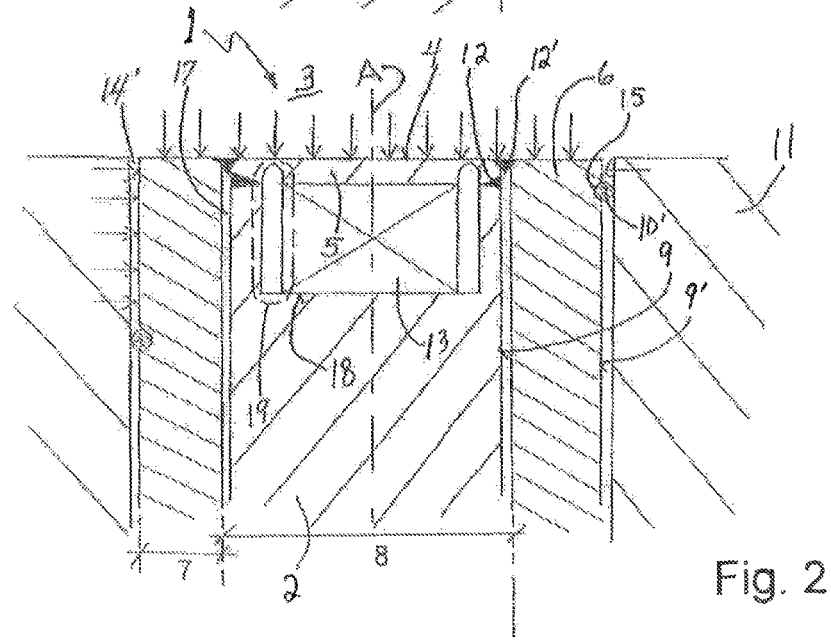
FIG. 2 a schematic illustration of a sensor according to the invention.

FIG. 2 shows a sensor 1 according to the invention in a tool 11. It is primarily constructed in the same way as the sensor 1 according to the prior art. It therefore comprises a housing 2 with a jacket surface 9 and with an axis A, a diaphragm 5 attached to the housing 2, which when installed is exposed to a pressure space 3 at its end face 4. The diaphragm 5 is typically also welded onto the housing 2, preferably at a weld seam 12. Behind this a measuring element 13, for example a piezoelectric crystal, is arranged, for determining a pressure acting on the diaphragm 5. Alternatives, such as optical measuring methods, are also possible here. The force path extends according to the description from FIG. 1.

According to the invention the sensor 1 in FIG. 2 has a pressure sleeve 6 with an outer jacket surface 9', which is arranged coaxially with the housing axis A outside the housing 2 and spaced apart from it by a gap 17. This must be connected tightly to the sensor 1 on the end face 4, preferably to a further weld seam 12'. The end face 4 of the sensor 1 according to the invention is also flat here, so as to leave no imprint behind during injection moulding.

In this arrangement a gap 14' is arranged between tool 11 and pressure sleeve 6. Due to the tight connection 12' at the end face between pressure sleeve 6 and housing 2, medium can no longer penetrate into the gap 17 and act on the jacket surface 9 of the housing 2 and cannot thereby corrupt any measurement. The medium, in particular a low-viscosity liquid in the case of injection moulding, can however now penetrate into the gap 14' and exert a force on the jacket surface 9' of the pressure sleeve 6, as is shown on one side in FIG. 2. In contrast to the housing wall thickness in this frontal region however the wall thickness 7 of the pressure sleeve 6 is stiff, so that the radially occurring pressure now hardly undergoes any deformation. In addition, the pressure sleeve 6 in this region is spaced apart from the housing 2 by the gap 17, so that any small flexing of the pressure sleeve 6 does not act on the wall of the housing, which means that no deflection of the diaphragm 5 has been produced either. At the end face the pressure sleeve 6 can be supported by means of the weld seam 12' on the diaphragm 5, which does not lead to a deflection of the diaphragm 5.

According to the invention this gap 17 must extend axially further across the measuring element 13 than the region of the force path 19 in the direction away from the pressure space 3. Any possible radial force, which acts from the pressure sleeve 6 on the housing 2, does not therefore affect the region of the force path 19 and cannot therefore be transmitted onto it either. Therefore, the further back this gap 17 ends, the more stress-free is the sensor 1 in its frontal region with its force path 19 across the measuring element.

Figure 5:
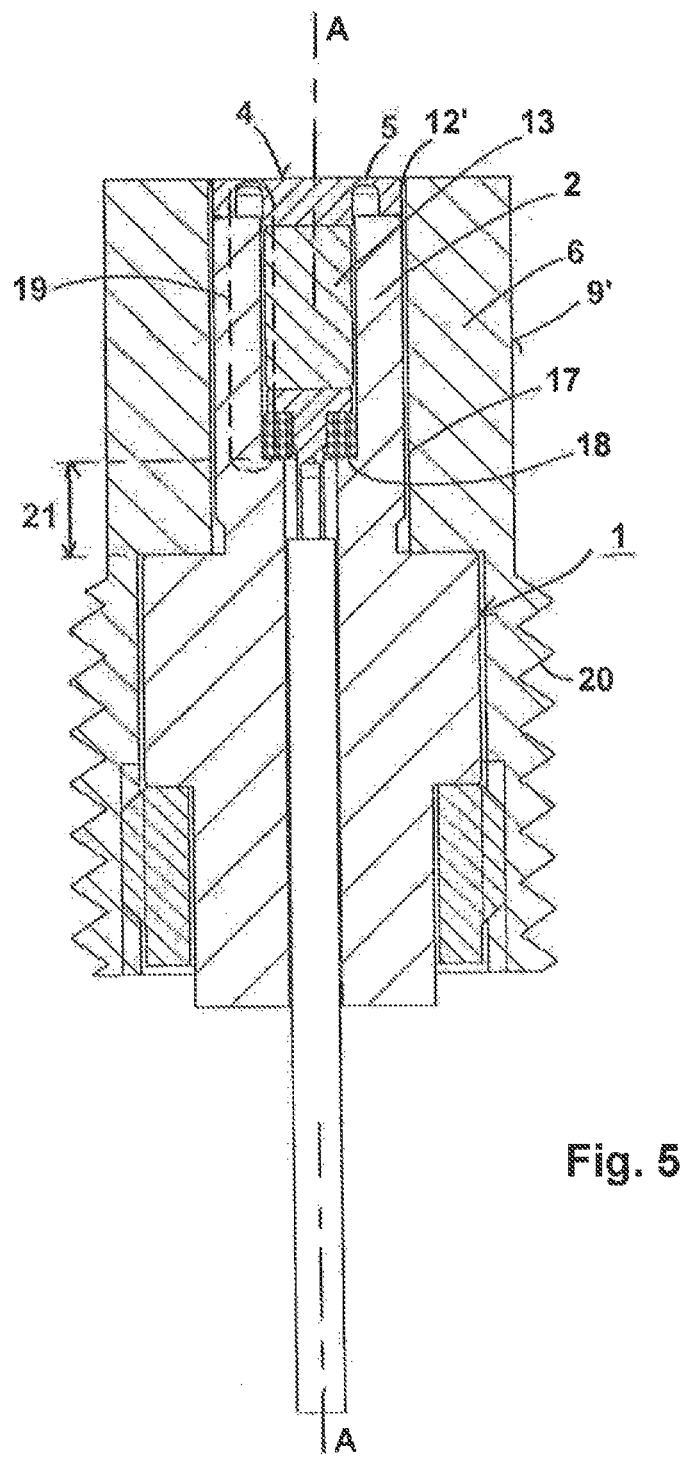
FIG. 5 an alternative illustration of a sensor according to the invention.

It is also desirable that the whole frontal region of the pressure sleeve 6 up to the rear end of the gap 17 is as free as possible from stresses. It has been shown that this is satisfied if this frontal region is also free of an external thread 20 such as shown in FIG. 5. An external thread 20, when installed in a prior art arrangement such as in FIG. 1, always leads to a torsional stress in the body radially inside the external thread 20. If no external thread is applied in the frontal region to the rear end of the gap 17, then no torsion can form between the front connection 12' and the end of the gap 17 either, which would affect the sensor accordingly.

In order to seal the gap 14' between pressure sleeve 6 and tool 11, an O-ring 10, 10' can be used. This is not essential, however. A seal can also be applied further back. Since in the device according to the invention the pressure sleeve 6 is designed to be much stronger than the wall of the housing 2 in the region of the measuring element 13, this O-ring 10' can be arranged very far forward. This mounting near to the front and near the pressure space 3 is shown in FIG. 2 on one side. In particular this O-ring 10' can be arranged in the area next to the diaphragm 5 and/or the measuring element 13. In the prior art this is not recommended, because the notch 15 required for this would further weaken the wall thickness of the housing 2. Due to this frontal attachment of the O-ring 10' in the design according to the invention, in addition the region in which the unwanted radial pressure can be applied to the jacket surface 9' of the pressure sleeve 6 is also reduced in size. This reduces the unwanted radial pressure such that the wall thickness of the pressure sleeve 6 can be locally reduced somewhat, without running a risk that the diaphragm 5 is thereby deflected by the lateral pressure.

An additional advantage of mounting the O-ring 10' near to the front is the reduction of the ridge which is formed by the penetration of the low-viscosity liquid into the gap 14' as far as the O-ring 10' during injection moulding. This has a positive effect on the quality of the parts.

Figure 3:
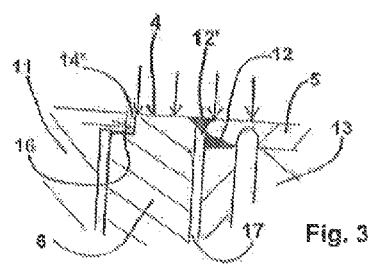
FIG. 3 an alternative embodiment of the frontal structure of the sensor according to the invention.

Preferred applications of the sensor 1 according to the invention are pressure measurements in injection moulding tools, in particular when simultaneously using low-viscosity media, but also pressure measurements in combustion chambers, in particular of internal combustion engines. In this case, instead of the O-ring 10' a stepped grommet could be attached to a shoulder 16, preferably very near to the front. Such an example is illustrated in FIG. 3. A general advantage of the sensor 1 according to the invention compared to conventional sensors is the fact that the frontal surface region 9' is insensitive to further processing. This relates in particular to the application of grooves or notches 15 for O-rings 10', the creation of projections/shoulders 16 for stepped grommets or the removal of material, in order to create a constant transition to an adjoining tool 11, for example in injection moulding.

It has been shown that the configuration according to the invention of the sensor 1 also behaves advantageously in applications in combustion chambers. Promoting heat dissipation from the diaphragm 5 via the sealed joint or weld seam 12' into the thick-walled pressure sleeve 6 reduces the temperature inside the sensor 1.

Figure 4:
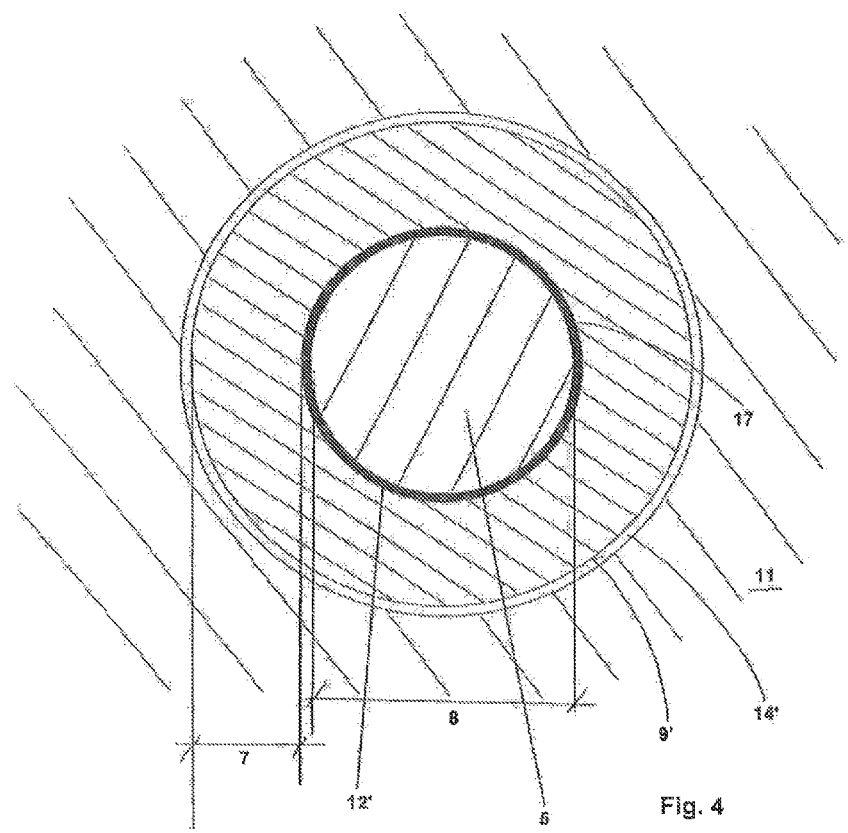
FIG. 4 a frontal view of a sensor according to the invention.

Studies have shown that the wall thickness 7 of the pressure sleeve 6 should preferably be between approximately half the size and the same size as its internal diameter 8, i.e. approximately between half the size and the same size as the diameter of the sensor housing 2 inside this pressure sleeve 6, as illustrated in FIG. 4. The diameter of the sensor 1 according to the invention at the end face is therefore roughly double to triple that of the embodiment according to the prior art described. In the case of small sensors, a wall thickness 7 of the pressure sleeve 6 on the order of magnitude of the inner diameter 8 of the pressure sleeve 6 is recommended.

Preferably, the pressure sleeve 6 is welded to the diaphragm 5 on its end face. Alternatively, a sensor 1 according to the invention can be constructed such that an integral, continuous configuration of the end face results. In this case the diaphragm 5 can be configured to be continuous up to the jacket surface 9' of the pressure sleeve 6. Disadvantages of this embodiment include the pre-stress conditions of the diaphragm 5 being difficult to obtain in front of the measuring element 13, and the installation of the measuring element 13. An advantage of the embodiment according to the invention is that the weld seam 12' on the end face is softer than the diaphragm 5 and the pressure sleeve 6. This means that at this weld seam 12' a kind of joint is produced, which suppresses the transmission of force from the pressure sleeve 6 onto the diaphragm 5, and therefore a deflection of the diaphragm 5 due to the unwanted radial pressure. The installation of the measuring element 13 remains unchanged.

In FIG. 5 a complete sensor according to the invention is shown in an alternative configuration. The reference labels correspond to those of FIG. 2. In this Figure the measuring element 13 is implemented as a piezoelectric crystal with transversal effect. Such a crystal is much more sensitive than one with longitudinal effect, and so even at low pressure differences it gives very accurate results. Preferably three such crystal plates are used, arranged in a circle.

In addition, a temperature sensor can be installed in a sensor according to FIG. 2 or 5, in order to measure both pressure and temperature at the same time. This is preferably arranged centrally in the sensor 1. With three measuring elements with transversal effect arranged in a circle, space is available in the centre for such a temperature sensor.

In this FIG. 5 the force path 19 is shown in particular, which extends across the projection 18 of the housing 2. Between this projection 18 of the housing 2 and the end of the gap 17, an offset 21 of at least 5, preferably at least 10 mm should exist. This guarantees that a radial force acting at the end of the gap 17 no longer has any effect on the force path 19.

In addition, an external thread 20 is also indicated here, with which the sensor 1 can be fastened to a drilled hole in the tool 11. Since the external thread 20 begins after the end of the gap 17, no moment is generated on the pressure sleeve 6 between the sensor front 4 and the rear end of the gap 17 when mounting into the hole, and therefore none is transmitted on to the frontal region of the sensor 1 either.

LIST OF REFERENCE MARKS

1 sensor
2 housing, sensor housing
3 pressure space
4 end face of sensor
5 diaphragm
6 pressure sleeve
7 wall thickness
8 internal diameter
9 9' (outer) jacket surface
10 10' O-ring
11 tool
12 12' connection, weld seam
13 measuring element, piezoelectric crystal
14 14' gap
15 notch
16 shoulder
17 gap
18 projection of the housing
19 force path
20 external thread
21 offset
A axis

The invention claimed is:

1. Sensor for measuring pressures in low-viscosity media for use in injection molding, comprising:
a housing defining a projection with an axis A running through the projection,
a diaphragm which has two opposite sides and is permanently connected contacting the housing, a first one of the two opposite sides of the diaphragm defines a flat end face that is exposed to a pressure space, a second one of the two opposite sides being disposed facing the projection of the housing,
wherein a measuring element which can infer a pressure prevailing in the pressure space on the basis of deflection of the diaphragm is supported by the projection and arranged behind the second side of the diaphragm and surrounded by the housing,
wherein a pressure sleeve is arranged coaxially with the housing axis A outside the housing, said pressure sleeve is tightly connected by a connection contacting the end face of the diaphragm, and on the side of this connection disposed away from the pressure space, there is a gap that separates the pressure sleeve from the housing,
wherein the force path from the pressure space extends axially in the direction away from the pressure space in a region across the end face, the measuring element and the projection of the housing,
wherein said gap extends axially further than the region of the force path across the measuring element in the direction away from the pressure space.

2. The sensor according to claim 1, wherein the pressure sleeve in the entire area radially outside the gap comprises no external thread for fixing into a drilled hole.

3. The sensor according to claim 1, wherein the wall thickness of the pressure sleeve is at least half as large as the inner diameter of the pressure sleeve in the region of the diaphragm.

4. The sensor according to claim 1, wherein said gap extends axially further across the measuring element by an offset of at least 5 mm, than the region of the force path in the direction away from the pressure space.

5. The sensor according to claim 1, wherein the measuring element comprises one or more piezoelectric elements with transversal effect.

6. The sensor according to claim 1, wherein the sensor additionally comprises a temperature measuring element.

7. The sensor according to claim 6, wherein the temperature measuring element is arranged centrally in the sensor.

8. Sensor for measuring pressures in low-viscosity media for use in injection molding, comprising:
a housing with an axis A,
a flat end face to be exposed to a pressure space, and
a diaphragm which is arranged on the end face and is permanently connected contacting the housing,
wherein a measuring element which can infer a pressure prevailing in the pressure space on the basis of deflection of the diaphragm is arranged behind the diaphragm and surrounded by the housing,
wherein a pressure sleeve is arranged coaxially with the housing axis A outside the housing, said pressure sleeve is tightly connected contacting the sensor on the end face, and behind this connection, is arranged at a distance from the housing with a gap,
wherein said gap extends axially further than the region of the force path across the measuring element in the direction away from the pressure space; and
wherein the pressure sleeve is welded onto the end face of the diaphragm.

9. The sensor according to claim 1, wherein the pressure sleeve has an outer ring jacket surface, which near to the front thereof is provided with an O-ring or a shoulder.

10. The sensor according to claim 1, wherein the connection at the end face is a weld seam between pressure sleeve and housing.

\* \* \* \* \*